US012654461B2

(12) United States Patent
Hatakeyama et al.

(10) Patent No.: US 12,654,461 B2
(45) Date of Patent: Jun. 16, 2026

(54) TRANSPARENT MEMBER AND LIQUID EJECTION APPARATUS

(71) Applicant: CANON KABUSHIKI KAISHA, Tokyo (JP)

(72) Inventors: Takuya Hatakeyama, Kanagawa (JP); Gou Sasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 184 days.

(21) Appl. No.: 18/598,678

(22) Filed: Mar. 7, 2024

(65) Prior Publication Data

US 2024/0308231 A1 Sep. 19, 2024

(30) Foreign Application Priority Data

Mar. 17, 2023 (JP) ................................ 2023-043070

(51) Int. Cl.
*B41J 2/175* (2006.01)

(52) U.S. Cl.
CPC ....... *B41J 2/17566* (2013.01); *B41J 2/17509* (2013.01); *B41J 2/17553* (2013.01); *B41J 2002/17573* (2013.01)

(58) Field of Classification Search
CPC .... B41J 2/175; B41J 2/17506; B41J 2/17509; B41J 2/17513; B41J 2/1752; B41J 2/17553; B41J 2/17566; B41J 2002/17573; B41J 29/13
See application file for complete search history.

(56) References Cited

U.S. PATENT DOCUMENTS

2014/0104349 A1* 4/2014 Kimura ................ B41J 2/17553 347/85
2019/0092037 A1 3/2019 Murata ................ B41J 2/17566
2021/0046762 A1* 2/2021 Hirai ........................ B41J 29/13
2022/0315781 A1* 10/2022 Aoki .................... C09D 11/102

FOREIGN PATENT DOCUMENTS

JP 2019-059200 4/2019

* cited by examiner

*Primary Examiner* — Anh T Vo
(74) *Attorney, Agent, or Firm* — Venable LLP

(57) ABSTRACT

A liquid ejection apparatus including a liquid ejection head for ejecting liquid onto a printing medium, a liquid tank with a transparent front wall for storing liquid, a transparent portion arranged facing the front wall through one can visually recognize the remaining amount, an indicator on the transparent portion indicates whether all liquid stored in a predetermined liquid bottle in an unused state can be injected into the liquid tank. A reception unit receives a display command asking whether delivery of a transparent member with which the transparent portion can be exchanged is necessary, a display unit displays the graphical user interface when the reception unit receives the display command, an obtaining unit obtains instructions input based on contents displayed on the display unit, and a transmission unit transmits a delivery command for requesting delivery of the transparent member to an external device.

6 Claims, 13 Drawing Sheets

TRANSPARENT MEMBER AND LIQUID EJECTION APPARATUS

BACKGROUND

This application claims the benefit of Japanese Patent Application No. 2023-043070, filed Mar. 17, 2023, which is hereby incorporated by reference herein in its entirety.

FIELD OF THE INVENTION

The present invention relates to a transparent member and a liquid ejection apparatus.

DESCRIPTION OF THE RELATED ART

Japanese Patent Laid-Open No. 2019-059200 has disclosed a liquid ejection apparatus capable of detecting the remaining amount of liquid within a liquid tank and a liquid bottle in a case when the liquid tank is replenished with liquid from the liquid bottle.

However, with the configuration of Japanese Patent Laid-Open No. 2019-059200, it is not possible for a user to determine whether or not all the liquid stored in an unused liquid bottle can be injected into the liquid tank. In a case when it is not possible to inject all the liquid within the liquid bottle into the liquid tank, it is complicated to manage the liquid bottle in which liquid still remains.

Consequently, an object is to provide a technique capable of causing a user to recognize that it is possible to inject all the liquid stored in the unused liquid bottle into the liquid tank.

SUMMARY

The transparent member according to the present invention is a transparent member arranged facing a liquid tank and through which liquid stored in the liquid tank can be seen from the outside, wherein, in order to indicate whether or not it is possible to inject all the liquid stored in a predetermine liquid bottle in an unused state into the liquid tank, an indicator is formed, which can be compared with a liquid surface of liquid sored in the liquid tank.

Further features of the present invention will become apparent from the following description of exemplary embodiments with reference to the attached drawings.

DESCRIPTION OF THE EMBODIMENTS

Hereafter, with reference to the attached drawings, the present invention is explained in detail in accordance with preferred embodiments. Configurations shown in the following embodiments are merely exemplary and the present invention is not limited to the configurations shown schematically.

First Embodiment

<Hardware Configuration of Liquid Ejection Apparatus 100>

Figure 1:
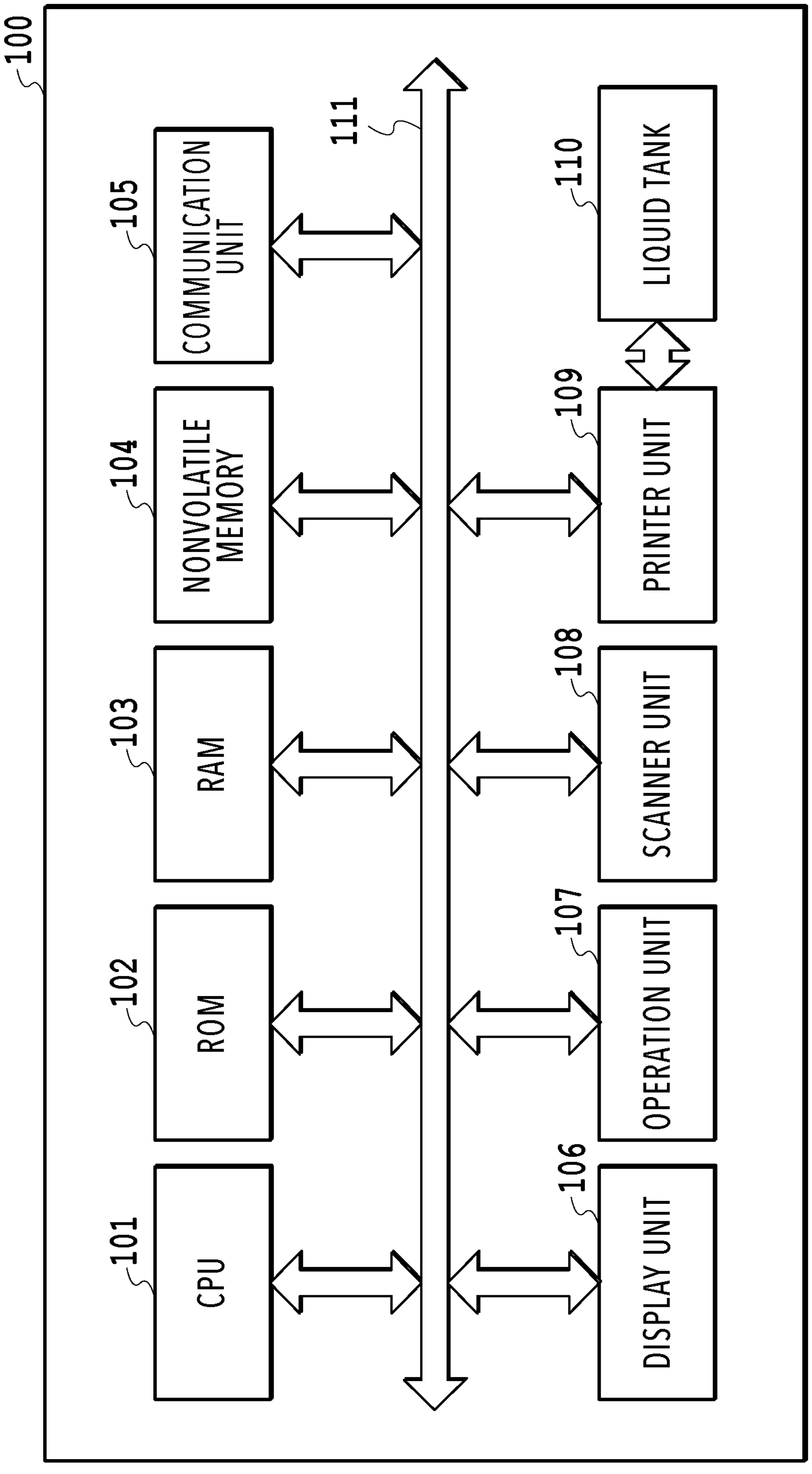
FIG. 1 is a block diagram showing one example of a hardware configuration of a liquid ejection apparatus in one embodiment.

FIG. 1 is a block diagram showing one example of the hardware configuration of a liquid ejection apparatus 100 in the present embodiment.

In the drawings that are referred to in the present specification, the X-direction and the Y-direction indicate two directions perpendicular to each other on a horizontal plane. The Z-direction indicates the vertical direction. The +Y-direction indicates the forward direction of the liquid ejection apparatus 100, the −Y-direction indicates the backward direction, the −X-direction indicates the leftward direction, the +X-direction indicates the rightward direction, the +Z-direction indicates the upward direction, and the −Z-direction indicates the downward direction, respectively. In the following explanation, unless described particularly, the upward, downward, leftward, and rightward directions indicate directions of the orientation in which the liquid ejection apparatus 100 is used in the normal state.

The "printing medium" in the present specification includes not only paper used in a general liquid ejection apparatus but also what is capable of receiving liquid, such as cloth, plastic film, metal plate, glass, ceramics, resin, wood, or leather.

In the present specification, an explanation is given by taking ink as one example of "liquid". However, the liquid that can be used for the liquid ejection apparatus 100 of the present embodiment is not limited to ink. That is, as the liquid, it may also be possible to use various printing liquids including a processing liquid that is used for the purpose of improving the fixing property of ink in a printing medium, reducing gloss unevenness, or improving scratch resistance.

In the present embodiment, an explanation is given by assuming a case when the liquid ejection apparatus 100 is an ink jet printer capable of printing an image on a printing medium by the ink jet method. The ink jet printer is configured so as to be capable of printing a color image on a printing medium by ejecting a plurality of types liquid whose colors are different. That is, the ink jet printer is configured so as to be capable of performing color printing for a printing medium.

As shown in FIG. 1, the liquid ejection apparatus 100 comprises a CPU (Central Processing Unit) 101, a ROM (Read Only Memory) 102, and a RAM (Random Access Memory) 103. Further, the liquid ejection apparatus 100 comprises a nonvolatile memory 104, a communication unit 105, a display unit 106, an operation unit 107, a scanner unit 108, a printer unit 109, a liquid tank 110, and a bus 111.

The CPU 101 is a central processing unit for controlling each unit within the liquid ejection apparatus 100. In the ROM 102, various program codes are stored. In the RAM 103, image data, or the like, is stored temporarily in a case when various services relating to printing are performed. In the RAM 103, there is a case where buffering is performed at the time of the execution of these services.

The nonvolatile memory 104 is configured so as to be capable of storing nonvolatile information. As one example of the nonvolatile memory 104, there is an EEPROM (Electrical Erasable Read Only Memory), a flash memory, or the like. As one example of nonvolatile information, there are shipment information on the liquid ejection apparatus 100, language, setting, and the like.

The communication unit 105 is configured so as to be capable of connecting with an external device via a USB (Universal Serial Bus) or network. That is, it is possible for the communication unit 105 to perform communication with an external device by connecting to a USB or network. Information received by the communication unit 105 is stored in the RAM 103 and the nonvolatile memory 104.

The display unit 106 is configured so as to be capable of displaying a predetermined GUI (Graphical User Interface), character, graphics, indicator, and the like. As one example of the display unit 106, there is a liquid crystal display, or the like. The example of the display unit 106 is not limited to the liquid crystal display. As another example of the display unit 106, there is an LED (Light Emitting Diode), another display, or the like. As one example of information that is displayed on the display unit 106, there are setting information, status information and the like on the liquid ejection apparatus 100. The drive of the display unit 106 is controlled by the CPU 101.

The operation unit 107 is configured so as to enable a user to perform various input operations. The operation unit 107 includes switches, hard keys, and the like, for a user to perform various input operations. It may also be possible for the display unit 106 to perform the function as the operation unit with which input operations, and the like, are performed, like a touch panel.

The scanner unit 108 has the function as a scanner. The printer unit 109 has the function to print an image on a printing medium. For example, the printer unit 109 performs color printing for a printing medium based on image data received from an external device via the communication unit 105. Printing of an image on a printing medium may be performed based on image data or the like read from the scanner unit 108.

Each of the units described above is connected to one another by the bus 111. It is possible for each of the units described above to perform transmission and reception of data to and from one another via the bus 111.

Further, the liquid tank 110 is connected to the printer unit 109. The liquid tank 110 is configured so as to be capable of storing liquid used for printing. Liquid is supplied from the liquid tank 110 to the print head of the printer unit 109.

Figure 2:
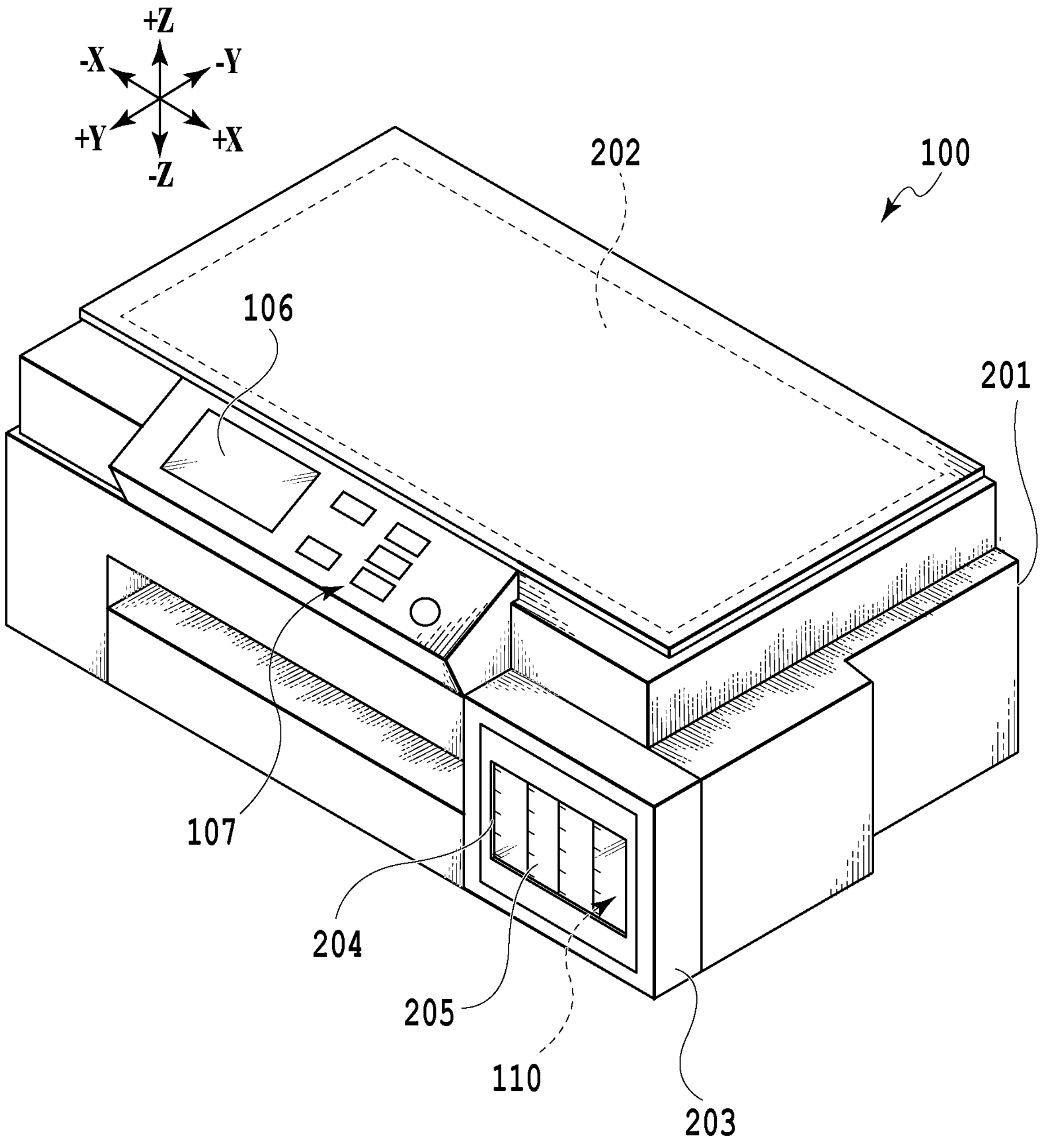
FIG. 2 is a perspective diagram showing one example of the liquid ejection apparatus in one embodiment.

FIG. 2 is an outer appearance perspective diagram showing one example of the liquid ejection apparatus 100 in the present embodiment. As shown in FIG. 2, the liquid ejection apparatus 100 comprises a casing 201 in the shape of a box, a document table 202 capable of placing a document, and a tank cover 203 configured so as to be capable of being opened and closed for the casing 201. The tank cover 203 is arranged for covering the liquid tank 110.

In a case when a document placed on the document table 202 is scanned optically by the scanner unit, the document is converted into electronic data. Further, the electronic data is converted into image data in a designated file format. The image data is transmitted to an external device from the communication unit, stored in a storage area, such as an HDD (Hard Disk Drive), and so on.

Further, the liquid ejection apparatus 100 also has the copy function. The copy function is implemented by transferring image data generated by scanning a document placed on the document table 202 by the scanner unit to the printer unit and by the printer unit printing an image on a printing medium based on the image data.

In the present embodiment, in the tank cover 203 a window frame 204 (opening) for a user to check the remaining amount of liquid in the liquid tank 110 is formed. Then, in the tank cover 203, a transparent portion 205 covering the window frame 204 is arranged. In the present embodiment, the transparent portion 205 may not be attachable to and detachable from the tank cover 203.

The "transparent" in the present specification means the degree of transparency at which it is possible to visually check the remaining amount of liquid stored internally.

In the state where the tank cover 203 is closed, the window frame 204 and the transparent portion 205 face a transparent erect wall (to be described later) comprised by the liquid tank 110. The transparent portion 205 is arranged so that it is possible to see through the liquid stored in the liquid tank 110 from the outside of the casing 201. The transparent portion 205 comprises an indicator indicating whether or not it is possible to inject all the liquid stored in the liquid bottle in the unused state into the liquid tank 110. Then, this indicator is formed so as to be capable of being compared with the liquid surface of the liquid stored in the liquid tank 110. In the present embodiment, the indicator indicating that it is possible to inject all the predetermined capacity of liquid stored in the liquid bottle in the unused state is formed at the front surface of the transparent portion 205 facing in the opposite direction of the back of the transparent portion 205 facing the liquid tank 110.

Consequently, in the state where the tank cover 203 is closed, it is possible for a user to see (visually recognize) the height of the liquid surface (remaining amount of liquid) inside the liquid tank 110 through the erect wall of the transparent portion 205 and the liquid tank 110.

<Replenishment Method of Liquid>

Figure 3A:
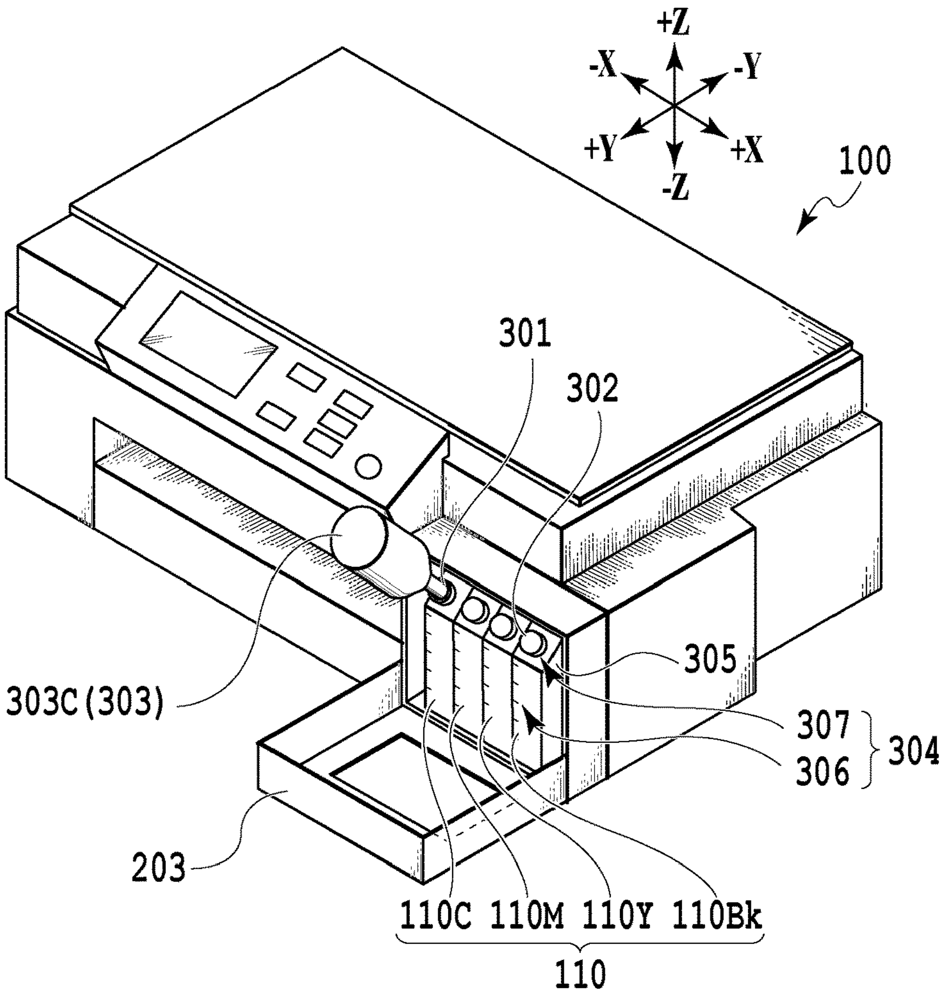
FIG. 3A is a perspective diagram showing the liquid ejection apparatus in a state of being replenished with liquid by a liquid bottle.
Figure 3B:
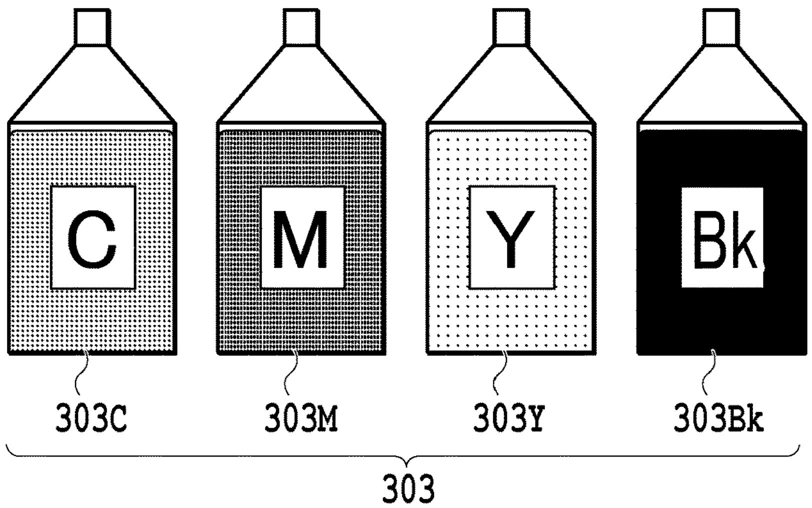
FIG. 3B is a diagram showing one example of liquid bottles that can be used in the present embodiment.

FIG. 3A and FIG. 3B are diagrams for explaining a replenishment method of liquid in the present embodiment. In the following, with reference to FIG. 3A and FIG. 3B, the replenishment method of liquid in the present embodiment is explained.

FIG. 3A is a perspective diagram showing the liquid ejection apparatus 100 in the state of being replenished with liquid by a liquid bottle 303.

As shown in FIG. 3A, the liquid tank 110 includes liquid tanks 110C, 110M, 110Y, and 110Bk capable of storing each ink of colors of cyan, magenta, yellow, and black. The basic configuration comprised by each of the liquid tank 110C, the liquid tank 110M, the liquid tank 110Y, and the liquid tank 110Bk is substantially the same.

In the following, in a case when it is not necessary to distinguish the liquid tank 110C, the liquid tank 110M, the liquid tank 110Y, and the liquid tank 110Bk from one another particularly, each of them is simply referred to as the liquid tank 110.

FIG. 3B is a diagram showing one example of the liquid bottle 303 that can be used in the present embodiment.

As shown in FIG. 3B, the liquid bottle 303 includes liquid bottles 303C, 303M, 303Y, and 303Bk in which each ink of colors of cyan, magenta, yellow, and black is stored in advance. The basic configuration comprised by each of the liquid bottle 303C, the liquid bottle 303M, the liquid bottle 303Y, and the liquid bottle 303Bk is substantially the same.

In the following, in a case when it is not necessary to distinguish the liquid bottle 303C, the liquid bottle 303M, the liquid bottle 303Y, and the liquid bottle 303Bk from one another particularly, each of them is simply referred to as the liquid bottle 303.

As shown in FIG. 3A, the liquid tank 110 exhibits the outline of substantially a parallelepiped. The liquid tank 110 comprises a front wall 304, a right wall 305, a left wall (not shown schematically), a rear wall (not shown schematically), a top wall (not shown schematically), and a bottom wall (not shown schematically). The front wall 304 includes an erect wall 306 extending substantially in the vertical direction from the bottom wall and transparent, and an inclined wall 307 connected to the top end of the erect wall 306 and inclined in the vertical direction and in the forward and backward direction. The inclined wall 307 is inclined backward with respect to the erect wall 306. In the inclined wall 307, a liquid injection port 301 for injecting liquid is formed.

Further, to the liquid injection port 301, a cap 302 is attached detachably. In a case when the replenishment of liquid is not performed, the liquid injection port 301 is closed with the cap 302. This is because of a desire to suppress liquid from evaporating from within the liquid tank 110 and foreign matter from entering the liquid tank 110. In a case of replenishment of liquid, the liquid is injected into the liquid tank 110 from the liquid bottle 303 in the state where the tank cover 203 is opened, the cap 302 is removed, and the liquid bottle 303 is mounted in the liquid injection port 301.

In the present embodiment, the capacity of the liquid bottle 303 is less than the capacity of the liquid tank 110. Because of this, in a case when the remaining amount of liquid within the liquid tank 110 is less than or equal to a predetermined value, it is possible to inject all the liquid stored in the liquid bottle 303 into the liquid tank 110 by one-time replenishment. In FIG. 3A, the state is shown where the replenishment of liquid is performed by mounting the liquid bottle 303C in the liquid injection port 301 of the liquid tank 110C, but it is also possible to perform the replenishment of another color ink in the same manner.

<Ejection of Liquid>

Figure 4:
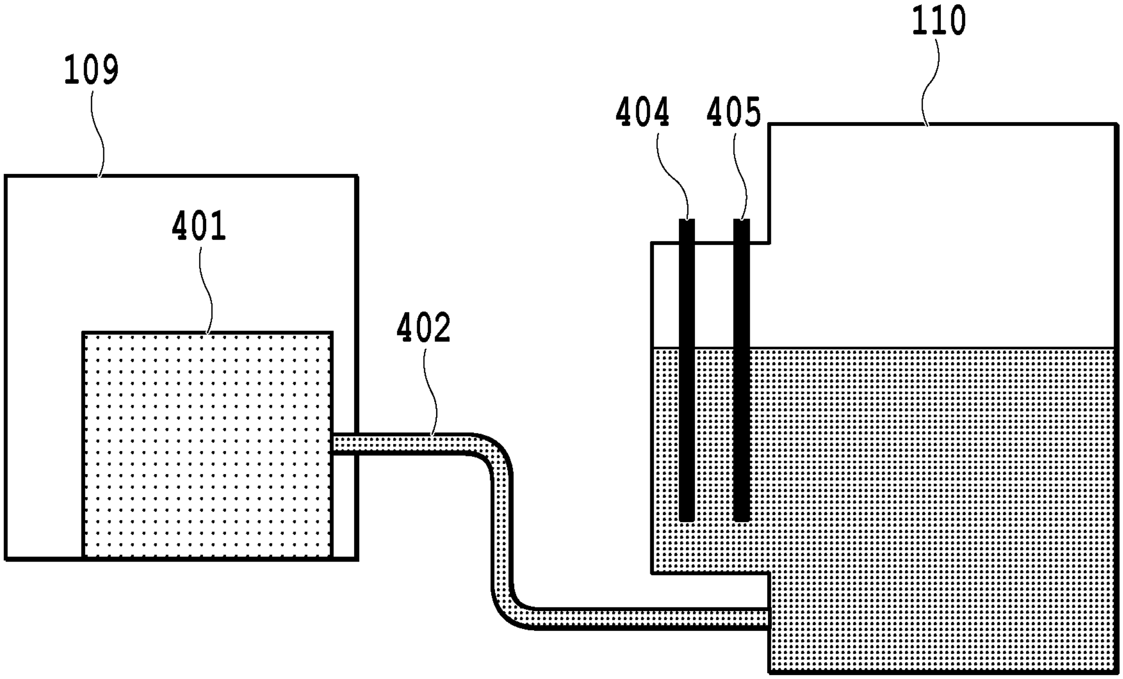
FIG. 4 is a diagram showing an outline configuration of a printer unit and a liquid tank in one embodiment.

FIG. 4 is a diagram showing an outline configuration of the printer unit 109 and the liquid tank 110 in the present embodiment. In FIG. 4, for easy understanding, an explanation is given by taking the configuration of one color as an example, but the configuration of the printer unit 109 and the liquid tank 110, which can be applied to the present embodiment, is the same for each of the other colors.

As shown in FIG. 4, the printer unit 109 comprises a liquid ejection head 401 capable of ejecting liquid based on the principle of the ink jet method. The liquid tank 110 and the liquid ejection head 401 are connected to each other by a tube 402 having flexibility. The liquid to be ejected from the liquid ejection head 401 is supplied from the liquid tank 110 via the tube 402.

The liquid ejection head 401 comprises an ejection unit (not shown schematically) in which a plurality of ejection ports (not shown schematically) for ejecting liquid is arrayed. In the ejection unit, in correspondence to each of the plurality of ejection ports, an ejection energy generation element (not shown schematically) is arranged. By driving the ejection energy generation element to generate ejection energy and ejecting liquid from the ejection port, printing of an image, or the like, is performed for a printing medium supported by a platen (not shown schematically). The drive of each ejection energy generation element described above is controlled by the CPU 101 (see FIG. 1).

In a case when liquid is ejected from the ejection port of the liquid ejection head 401 by the printing operation, the negative pressure within the liquid ejection head 401 increases. As a result of that, the liquid within the liquid tank 110 is supplied to the liquid ejection head 401 via a flow path including the tube 402.

Further, within the liquid tank 110, a positive electrode 404 and a negative electrode 405 (that is, a pair of electrodes) are arranged. In a case when the remaining amount of liquid within the liquid tank 110 is greater than or equal to a predetermined value, the positive electrode 404 and the negative electrode 405 are in the state of being immersed in the liquid (state shown in FIG. 4). The CPU 101 (see FIG. 1) obtains electrical information including a voltage, which is a difference in electric potential between the time of the application of voltage to the positive electrode 404 and the negative electrode 405 and the time of the completion of the application, and the like. Then, by comparing the electrical information with a reference value (threshold value), the CPU 101 estimates whether or not the remaining amount of liquid within the liquid tank 110 is greater than or equal to a predetermined value. The estimation results are displayed on the display unit 106 (see FIG. 1 and FIG. 3B).

According to the configuration such as this, it is possible to suppress the liquid ejection head 401 from operating despite the fact that the remaining amount of liquid within the liquid tank 110 is less than a predetermined value. The configuration in which the remaining amount of liquid within the liquid tank 110 is estimated by using the positive electrode 404 and the negative electrode 405 is not the indispensable configuration in the present invention.

<Liquid Tank 110>

Figure 5:
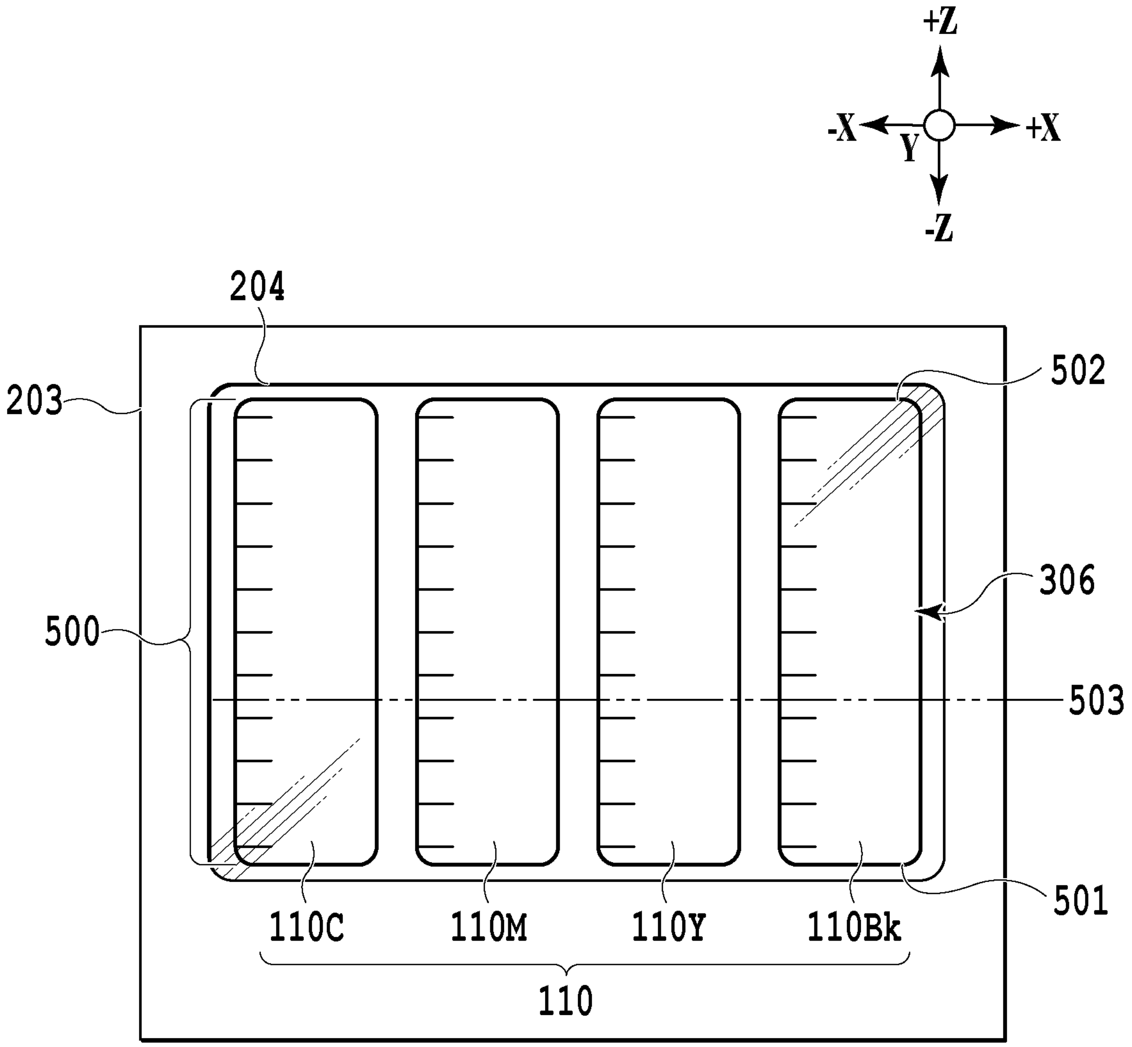
FIG. 5 is a front diagram showing one example of liquid tanks in one embodiment.

FIG. 5 is a front diagram showing one example of the liquid tank 110 in the present embodiment. In FIG. 5, for easy understanding, an explanation is given with the state where the transparent portion 205 is removed from the tank cover 203.

As shown in FIG. 5, on the erect wall 306, graduations 500 indicating the remaining amount of liquid are arranged along the vertical direction (Z-direction). The graduations 500 include a lower limit 501 indicating that the remaining amount of liquid in the liquid tank 110 is zero and an upper limit 502 indicating that the remaining amount of liquid in the liquid tank 110 full.

Further, a hypothetical line 503 in FIG. 5 indicates a threshold value indicating that it is possible to inject all the liquid stored in the unused liquid tank having a predetermined capacity. That is, in a case when the liquid surface of the liquid stored in the liquid tank 110 is located below the hypothetical line 503, it is possible for a user to inject all the liquid stored in the unused liquid bottle.

<Transparent Portion 205>

Figure 6:
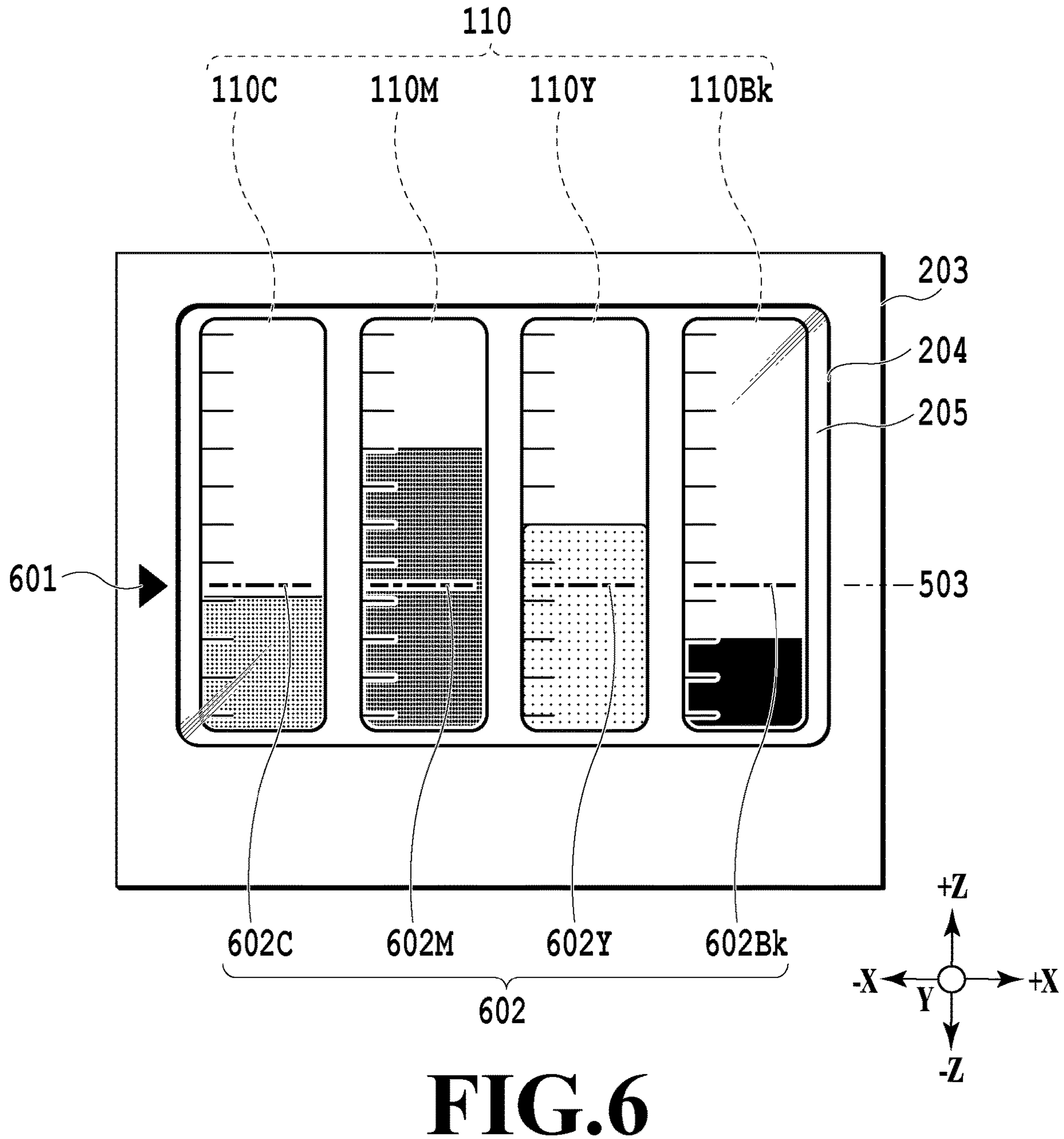
FIG. 6 is a front diagram showing one example of a tank cover in one embodiment.

FIG. 6 is a front diagram showing one example of the tank cover 203 in the present embodiment. In FIG. 6, explanation is given with the state where the transparent portion 205 is mounted to the tank cover 203.

As shown in FIG. 6, the transparent portion 205 (for example, transparent panel) has a rear surface facing the erect wall comprised by the liquid tank 110 and a front surface facing in the opposite direction of the rear surface in the state where the tank cover 203 is closed.

On the front surface of the transparent portion 205, an indicator is formed, which indicates that it is possible to inject all the liquid stored in the unused liquid bottle having a predetermined capacity into the liquid tank 110. The position of the indicator corresponds to the position of the remaining amount (height of the liquid surface) that moves to the position indicating the full state of the liquid tank 110 in a case when the liquid tank 110 is replenished with all the liquid stored in the unused liquid bottle.

Specifically, for the liquid tank 110, as the indicator indicating that all the liquid stored in the unused liquid bottle can be injected, an arrow 601 and a line 602 are formed. The line 602 in the present embodiment includes a line 602C, a line 602M, a line 602Y, and a line 602Bk.

The line 602C indicates that, in a case when the liquid surface of ink is at the line 602C or below, it is possible to inject all the liquid stored in the unused liquid bottle 303C (see FIG. 3B) into the liquid tank 110C. In this example, the liquid surface within the liquid tank 110C is located below the arrow 601 and the line 602C in the vertical direction. Because of this, it is possible for a user to visually recognize that all the liquid stored in the unused liquid bottle 303C can be injected into the liquid tank 110C, that is, the unused liquid bottle 303C can be used up.

The line 602M indicates that, in a case when the liquid surface of ink is at the line 602M or below, it is possible to inject all the liquid stored in the unused liquid bottle 303M (see FIG. 3B) into the liquid tank 110M. In this example, the liquid surface within the liquid tank 110M is located above the arrow 601 and the line 602M in the vertical direction. Because of this, it is possible for a user to visually recognize that all the liquid stored in the unused liquid bottle 303M cannot be injected into the liquid tank 110M, that is, even in a case when the ink is injected until the liquid tank 110M becomes full, the ink remains in the liquid bottle 303M.

The line 602Y indicates that, in a case when the liquid surface of ink is at the line 602Y or below, it is possible to inject all the liquid stored in the unused liquid bottle 303Y (see FIG. 3B) into the liquid tank 110Y. In this example, the liquid surface within the liquid tank 110Y is located above the arrow 601 and the line 602Y in the vertical direction. Because of this, it is possible for a user to visually recognize that all the liquid stored in the unused liquid bottle 303Y cannot be injected into the liquid tank 110Y.

The line 602Bk indicates that, in a case when the liquid surface of ink is at the line 602Bk or below, it is possible to inject all the liquid stored in the unused liquid bottle 303Bk (see FIG. 3B) into the liquid tank 110Bk. In this example, the liquid surface within the liquid tank 110Bk is located below the arrow 601 and the line 602Bk in the vertical direction. Because of this, it is possible for a user to visually recognize that all the liquid stored in the unused liquid bottle 303Bk can be injected into the liquid tank 110Bk.

In the following, in a case when it is not necessary to distinguish the line 602C, the line 602M, the line 602Y, and the line 602Bk from one another particularly, each of them is simply referred to as the line 602. In the present embodiment, the arrow 601 and the line 602 are drawn on the front surface of the transparent portion 205. In the state where the tank cover 203 is closed, the arrow 601 and the line 602 are located at the same height in the vertical direction as that of the hypothetical line 503. That is, at the position indicating that all the liquid stored in the unused liquid bottle can be injected, the arrow 601 and the line 602 are drawn.

Consequently, in a case when the liquid surface of the liquid stored in the liquid tank 110 is located below the arrow 601 and the line 602 in the vertical direction, it is possible for a user to inject all the liquid stored in the unused liquid bottle corresponding to the liquid tank 110 thereof. In this example, the arrow 601 and the line 602 are drawn on the front surface of the transparent portion 205, but the arrow 601 and the line 602 may be drawn on the rear surface of the transparent portion 205 or on the front surface of the transparent portion 205, or on both the front surface and the rear surface.

As explained above, on the transparent portion of the present embodiment, the indicator indicating that it is possible to inject all the liquid stored in the unused liquid bottle into the liquid tank is formed.

Consequently, according to the liquid ejection apparatus of the present embodiment, it is possible to cause a user to recognize that all the liquid stored in the unused liquid bottle can be injected into the liquid tank.

Further, the liquid ejection apparatus of the present embodiment does not require a separate electronic member for electrically connecting the liquid tank and the liquid bottle, and so on. Because of this, compared to the liquid ejection apparatus in Japanese Patent Laid-Open No. 2019-059200, which displays the remaining amount of liquid in each liquid tank by electrically connecting the liquid tank and the liquid bottle to each other, it is possible to cause a user to recognize that all the liquid stored in the unused liquid bottle can be injected by a simple configuration.

Second Embodiment

In the following explanation, to the configuration the same as or similar to that of the first embodiment, the same symbol is attached and explanation is omitted and different points are explained mainly.

Figure 7:
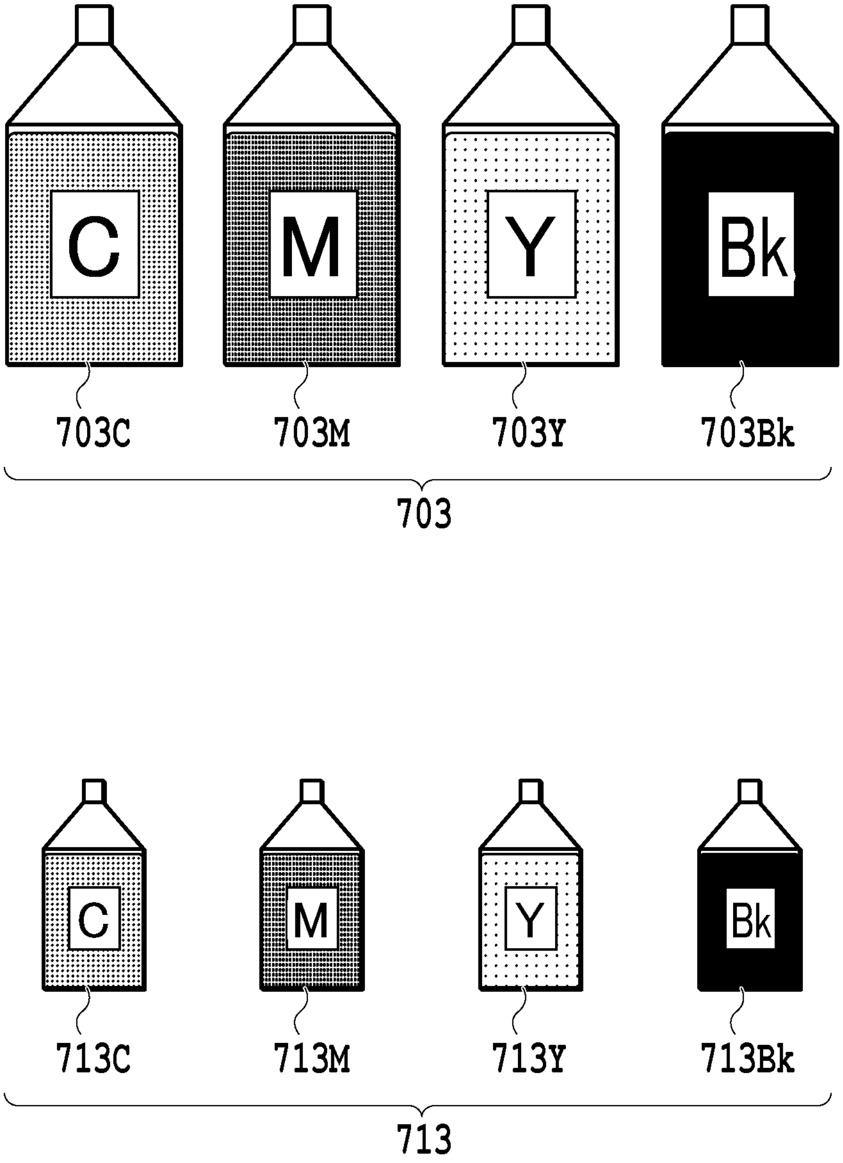
FIG. 7 is a diagram showing one example of liquid bottles that can be used in one embodiment.

FIG. 7 is a diagram showing one example of liquid bottles that can be used in the present embodiment.

As shown in FIG. 7, a first liquid bottle 703 includes first liquid bottles 703C, 703M, 703Y, and 703Bk in which each ink of colors of cyan, magenta, yellow, and black is stored in advance. In the following, in a case when it is not necessary to distinguish the first liquid bottle 703C, the first liquid bottle 703M, the first liquid bottle 703Y, and the first liquid bottle 703Bk from one another particularly, each of them is simply referred to as the first liquid bottle 703. The configuration of the first liquid bottle 703 is the same as that of the liquid bottle 303 (see FIG. 3B).

A second liquid bottle whose capacity is less than that of the first liquid bottle 703 includes second liquid bottles 713C, 713M, 713Y, and 713Bk in which each ink of colors of cyan, magenta, yellow, and black is stored in advance. In the following, in a case when it is not necessary to distinguish the second liquid bottle 713C, the second liquid bottle 713M, the second liquid bottle 713Y, and the second liquid bottle 713Bk from one another particularly, each of them is simply referred to as a second liquid bottle 713.

The configuration comprised by each of the second liquid bottle 713C, the second liquid bottle 713M, the second liquid bottle 713Y, and the second liquid bottle 713Bk is the same. Like the first liquid bottle 703, the second liquid bottle 713 is also configured so that the second liquid bottle 713C can be mounted in the liquid injection port 301 (see FIG. 3A) and replenishment of liquid is possible.

<Transparent Portion 805>

Figure 8:
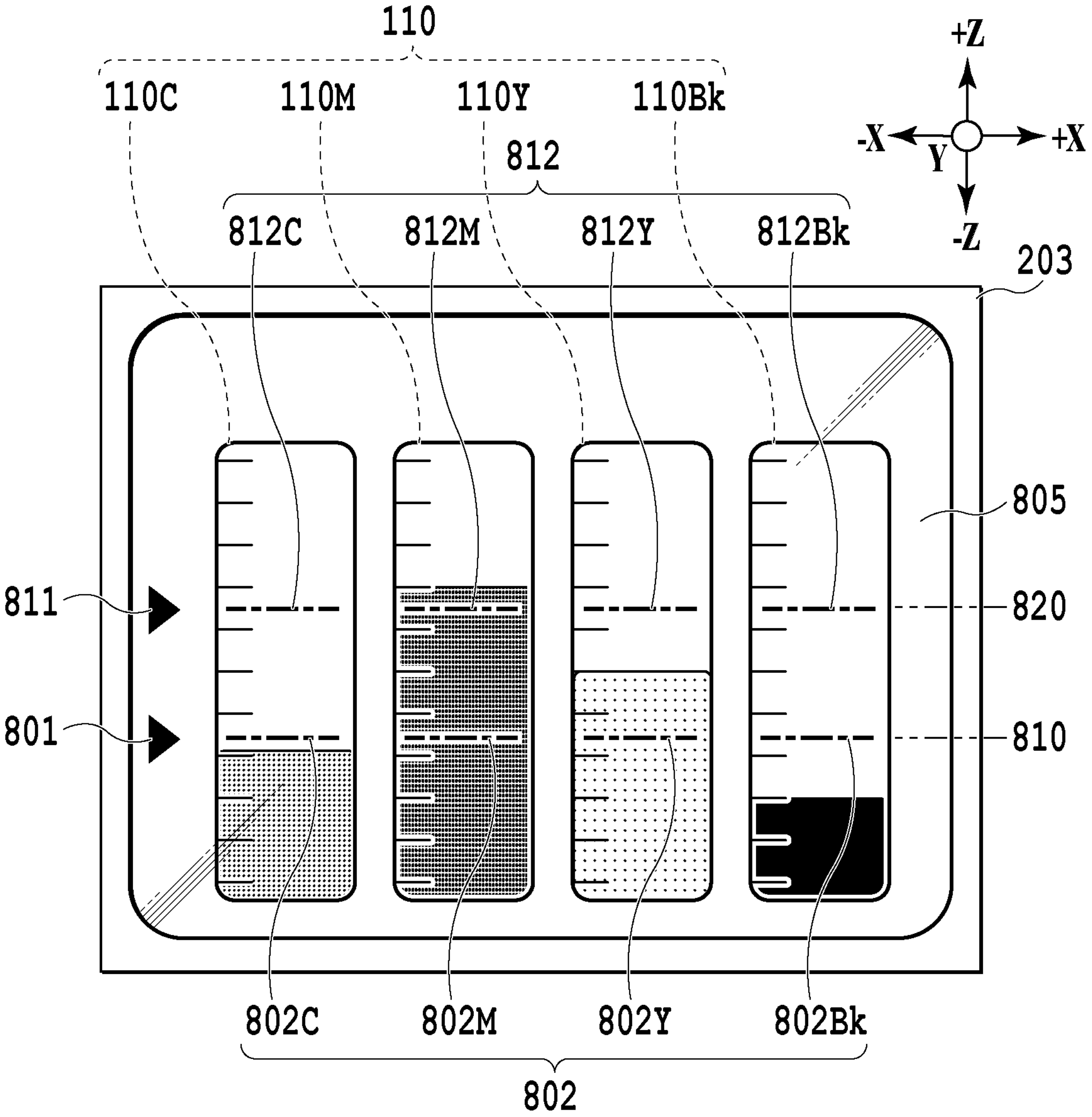
FIG. 8 is a front diagram showing one example of a transparent portion in one embodiment.

FIG. 8 is a front diagram showing one example of a transparent portion 805 in the present embodiment. A first hypothetical line 810 indicates a threshold value indicating that all the liquid stored in the unused first liquid bottle can be injected. A second hypothetical line 820 indicates a threshold value indicating that all the liquid stored in the unused second liquid bottle can be injected.

As shown in FIG. 8, the tank cover 203 in the present embodiment comprises the transparent portion 805 (for example, transparent panel) covering the window frame 204. On the front surface of the transparent portion 805, a first arrow 801 and a first line 802 are formed as a first indicator indicating that all the liquid within the unused first liquid bottle having a predetermined capacity can be injected. Further, on the front surface of the transparent portion 805, a second arrow 811 and a second line 812 are formed as a second indicator indicating that all the liquid within the second liquid bottle whose capacity is less than that of the first liquid bottle can be injected.

In the state where the tank cover 203 is closed, the position of the first arrow 801 and the first line 802 corresponds to the position of the remaining amount (height of the liquid surface) indicating that the liquid tank 110 becomes full in a case when the liquid tank 110 is replenished with all the liquid stored in the unused first liquid bottle. Further, the position of the second arrow 811 and the second line 812 corresponds to the position of the remaining amount (height of the liquid surface) indicating that the liquid tank 110 becomes full in a case when the liquid tank 110 is replenished with all the liquid stored in the unused second liquid bottle. That is, in the state where the tank cover 203 is closed, the position of the first arrow 801 and the first line 802 matches the first hypothetical line 810. Then, the position of the second arrow 811 and the second line 812 matches the second hypothetical line 820.

The first line 802 includes first lines 802C, 802M, 802Y, and 802Bk indicating that replenishment is possible with each ink of colors of cyan, magenta, yellow, and black. In the following, in a case when it is not necessary to distinguish the first line 802C, the first line 802M, the first line 802Y, and the first line 802Bk from one another particularly, each of them is simply referred to as the first line 802.

The first line 802 indicates that all the liquid stored in the unused first liquid bottle can be injected into the liquid tank 110 in a case when the liquid surface of the ink is at the first line 802 or below the first line 802. That is, in a case when the liquid surface of the ink is at the first line 802 or below the first line 802, it is possible for a user to visually recognize that the unused first liquid bottle can be used up.

The second line 812 includes second lines 812C, 812M, 812Y, and 812Bk indicating that replenishment is possible with each ink of colors of cyan, magenta, yellow, and black. In the following, in a case when it is not necessary to distinguish the second line 812C, the second line 812M, the second line 812Y, and the second line 812Bk from one another particularly, each of them is simply referred to as the second line 812.

The second line 812 indicates that all the liquid stored in the unused second liquid bottle can be injected into the liquid tank 110 in a case when the liquid surface of the ink is at the second line 812 or below the second line 812. That is, in a case when the liquid surface of the ink is at the second line 812 or below the second line 812, it is possible for a user to visually recognize that the unused second liquid bottle can be used up.

According to the configuration such as this, in the state where the tank cover 203 is closed, in a case when the liquid surface within the liquid tank 110 is located below the first arrow 801 and the first line 802 in the vertical direction, it is possible to inject all the liquid stored in the unused first liquid bottle.

Further, in the state where the tank cover 203 is closed, in a case when the liquid surface within the liquid tank 110 is located below the second arrow 811 and the second line 812 in the vertical direction, it is possible for a user to inject all the liquid stored in the unused second liquid bottle. In a case when the liquid surface within the liquid tank 110 is located between the first indicator and the second indicator, it is possible to inject all the liquid stored in the unused second liquid bottle, but it is not possible to inject all the liquid stored in the unused first liquid bottle.

Consequently, according to the liquid ejection apparatus of the present embodiment, even in a case when two types of liquid bottle whose capacities are different from each other exist, it is possible to cause a user to recognize whether or not all the liquid stored in each of these bottles can be injected.

Third Embodiment

In the following explanation, to the configuration the same as or corresponding to that of the first embodiment or the second embodiment, the same symbol is attached and an explanation is omitted and different points are explained mainly. In the present embodiment, it is possible for a user to select one of the two types of transparent member as the transparent portion and attach it to and detach it from the window frame formed in the tank cover.

Figure 9A:
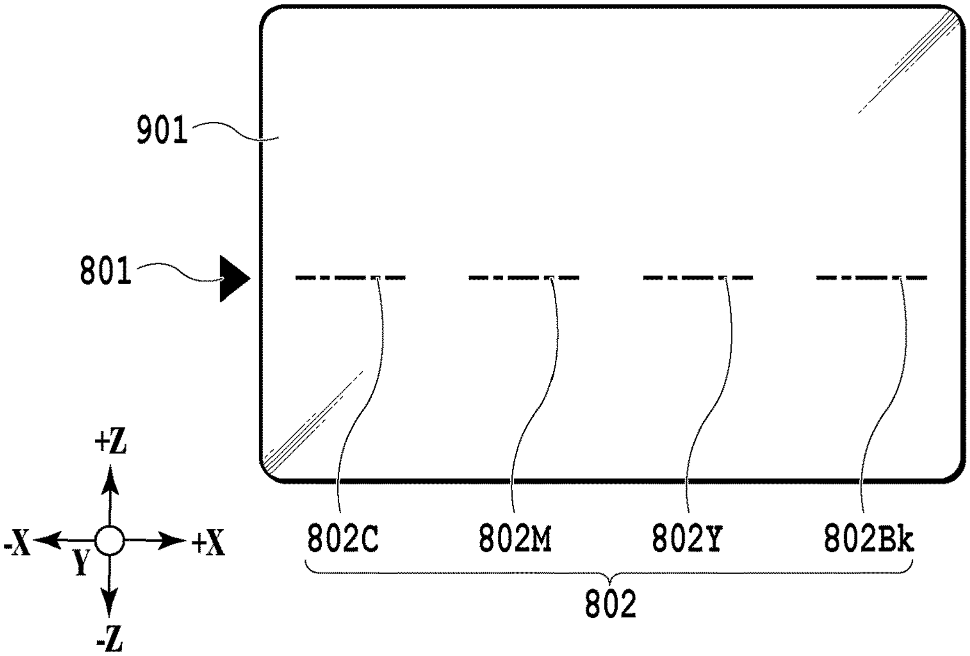
FIG. 9A is a front diagram of a first transparent member 901.
Figure 9B:
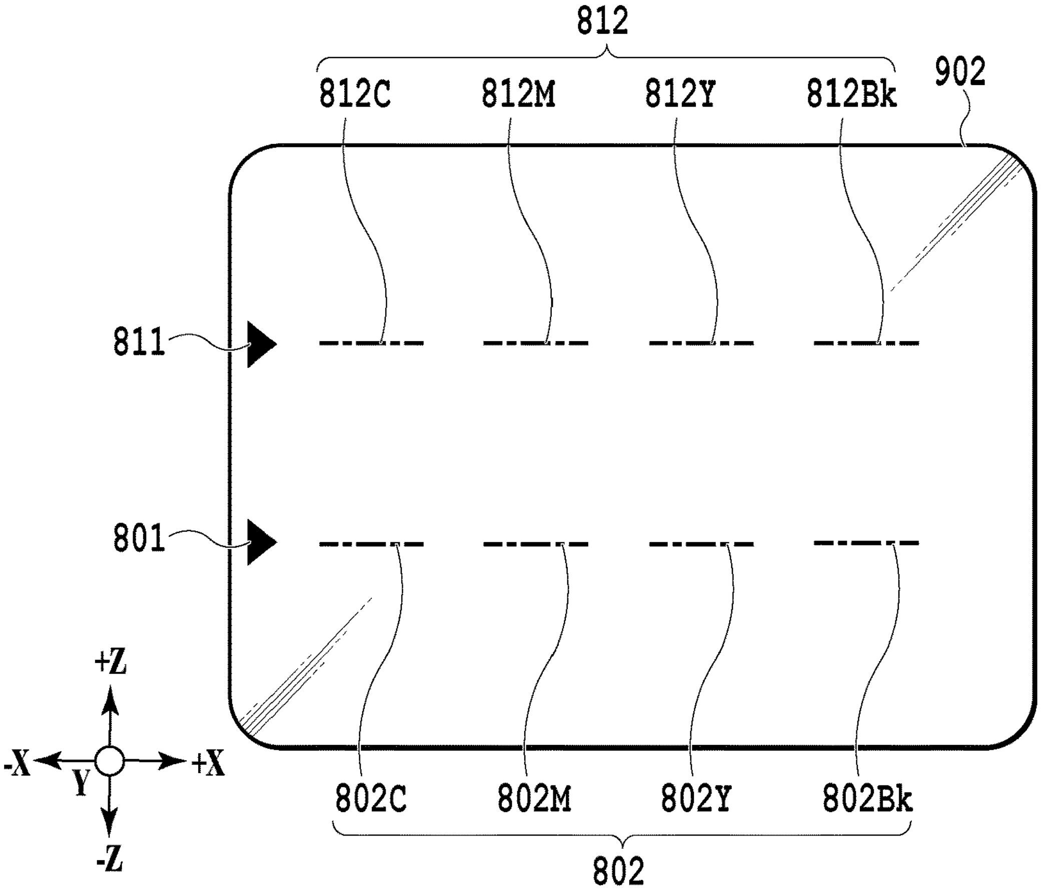
FIG. 9B is a front diagram of a second transparent member 902.

FIG. 9A and FIG. 9B are each a front diagram showing one example of the transparent member that can be used in the present embodiment. FIG. 9A is a front diagram of the first transparent member 901. FIG. 9B is a front diagram of the second transparent member 902.

As shown in FIG. 9A, in the first transparent member 901 (for example, transparent panel), the first arrow 801 and the first line 802 are formed.

As shown in FIG. 9B, in the second transparent member 902 (for example, transparent panel), the first arrow 801, the first line 802, the second arrow 811, and the second line 812 are formed.

Because of this, in a case when the first transparent member 901 (see FIG. 9A) is mounted for the window frame of the tank cover, in the state where the tank cover is closed, it is possible for a user to visually recognize whether or not all the liquid within the unused first liquid bottle can be injected.

On the other hand, in a case when the second transparent member 902 is mounted, it is possible to visually recognize whether or not all the liquid within the liquid bottle can be injected for each of the unused first liquid bottle 703 (see FIG. 7) and the unused second liquid bottle 713 (see FIG. 7).

Here, an explanation is given by supposing a case when the first transparent member 901 is exchanged with the second transparent member 902 after the liquid ejection apparatus is shipped in the state where the first transparent member 901 (see FIG. 9A) is mounted. For example, it is assumed that at the point in time of the shipment of the liquid ejection apparatus in the present embodiment, the first liquid bottle 703 (see FIG. 7) is provided in the market but the second liquid bottle 713 (see FIG. 7) is not provided. Then, it is assumed that after the liquid ejection apparatus in which the first transparent member 901 is mounted is shipped, the second liquid bottle 713 is determined to be provided in the market.

In this case, from the point in time of the shipment of the liquid ejection apparatus to the time in point at which the second liquid bottle is determined to be provided in the market, it is not necessary to provide the second transparent member 902 in the market. However, after the second liquid bottle is determined to be provided in the market, it is preferable for the second transparent member 902 also to be provided in the market. The reason is that it is made possible to visually recognize whether or not all the liquid stored in the second liquid bottle 713 can be injected by exchanging the first transparent member 901 mounted in the liquid ejection apparatus with the second transparent member 902.

Figure 10:
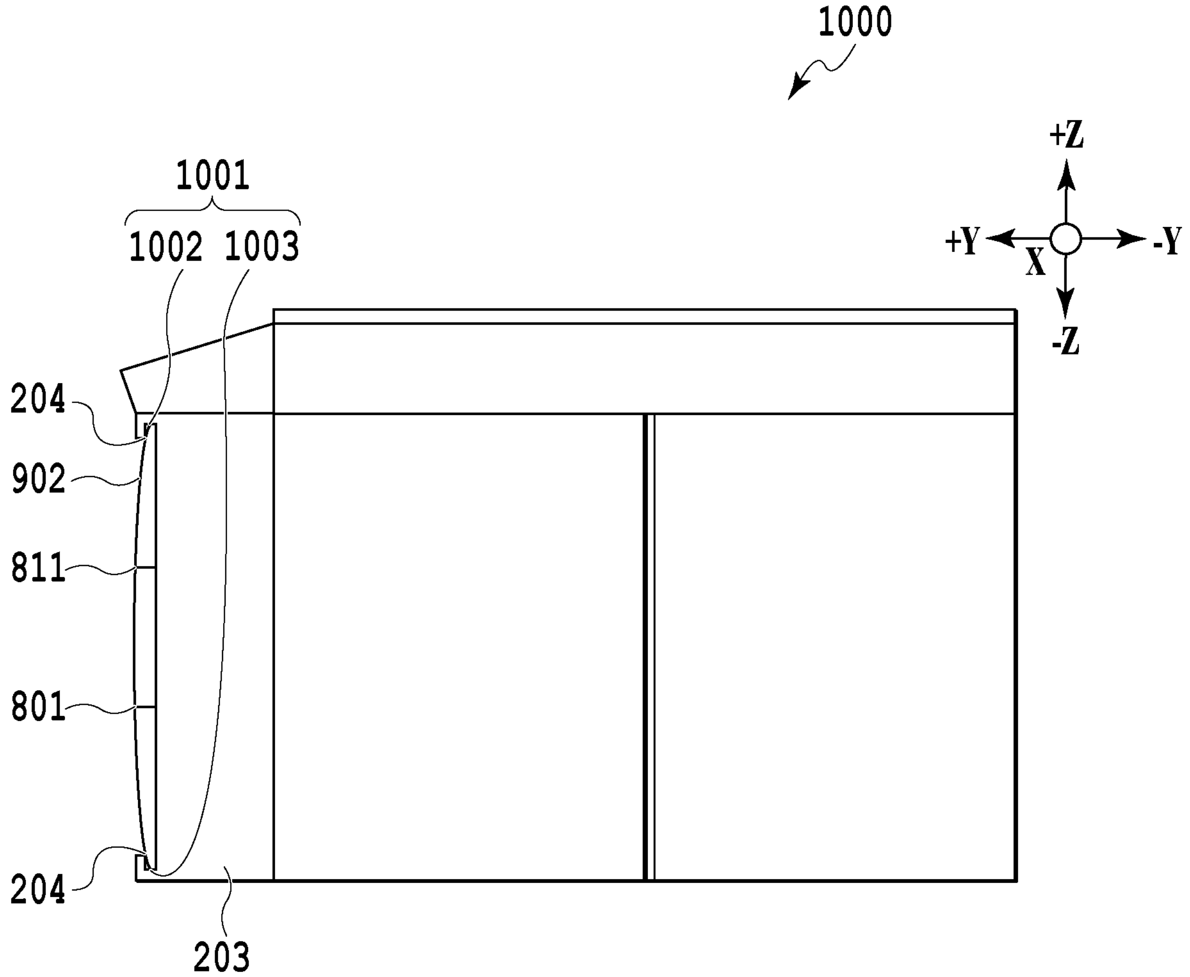
FIG. 10 is a side diagram showing one example of a liquid ejection apparatus in one embodiment.

FIG. 10 is a right side diagram showing one example of a third liquid ejection apparatus 1000 in the present embodiment.

As shown in FIG. 10, the third liquid ejection apparatus 1000 comprises a groove portion 1001 with which it is possible to attach and detach the first transparent member 901 (see FIG. 9A) or the second transparent member 902 to and from the window frame 204 formed in the tank cover 203. In FIG. 10, the second transparent member 902 is mounted.

The groove portion 1001 includes an upper groove 1002 formed so as to enable inserting the top end of the second transparent member 902 and a lower groove 1003 formed so as to enable inserting the bottom end of the second transparent member 902. The upper groove 1002 and the lower groove 1003 are provided so as to extend in the width direction (X-direction) of the window frame 204 behind (−Y-direction of) the window frame 204 so that their openings face each other.

In this example, it is possible to mount the second transparent member 902 by moving the second transparent member 902 along the direction in which the groove portion 1001 is provided so as to extend in the state where the top end and the bottom end of the second transparent member 902 are fit into the upper groove 1002 and the lower groove 1003, respectively. Of course it is possible to remove the second transparent member 902 by moving the second transparent member 902 along the direction in which the groove portion 1000 is provided so as to extend in the state where the second transparent member 902 is mounted. Further, as long as the first transparent member 901 and the second transparent member 902 have the same size, it is possible to attach and detach the first transparent member 901 in the same manner as that of the second transparent member 902.

As described above, in a case when the second liquid bottle is not provided in the market but the first liquid bottle is provided, it may be possible for a user to use the third liquid ejection apparatus 1000 in the state where the first transparent member 901 is mounted. Then, after the second liquid bottle is determined to be provided in the market, it may be possible for a user to use the third liquid ejection apparatus 1000 by exchanging the first transparent member 901 with the second transparent member 902. In this case, the second transparent member 902 may be provided so that it is possible for a user to obtain (for example, purchase) the second transparent member 902 at the same time of obtaining (purchasing) the second liquid bottle or obtain (purchase) the second transparent member 902 concomitantly with obtaining (purchasing) the second liquid bottle.

Due to this, even in a case when a liquid bottle with a new size (capacity) is provided in the market after the shipment of the third liquid ejection apparatus 1000, it is possible for a user to visually recognize whether or not all the liquid stored in the liquid bottle can be injected.

Fourth Embodiment

<System Configuration>

In the following explanation, to the configuration the same as or corresponding to that of the first embodiment to the third embodiment, the same symbol is attached and explanation is omitted and different points are explained mainly.

Figure 11:
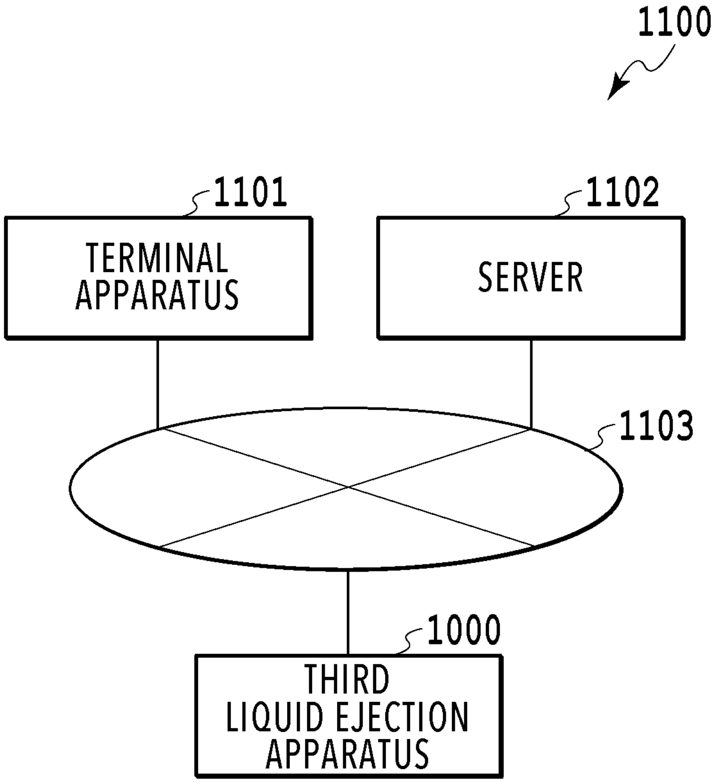
FIG. 11 is a diagram showing one example of a system configuration of an information processing system in one embodiment.

FIG. 11 is a diagram showing one example of the system configuration of an information processing system 1100 in the present embodiment.

As shown in FIG. 11, the information processing system 1100 includes a terminal apparatus 1101, a server 1102, and the third liquid ejection apparatus 1000 as system configurations. It is possible for the terminal apparatus 1101, the server 1102, and the third liquid ejection apparatus 1000 to perform the processing of the present embodiment. The third liquid ejection apparatus 1000 is one example of the information processing apparatus in the present embodiment.

In the present embodiment, on the display unit of the third liquid ejection apparatus 1000, it is also possible to display soft keys, and the like, for performing various input operations, in addition to information a user should be notified of. That is, the display unit of the third liquid ejection apparatus 1000 has a function as a user interface performing display, input operations, and the like.

The terminal apparatus 1101 and the server 1102 are apparatuses used by the service provider able to provide the second transparent member to a user. As one example of the terminal apparatus 1101, there is a PC (Personal Computer). The terminal apparatus 1101, the server 1102, and the third liquid ejection apparatus 1000 are connected so as to be capable of communication via a network 1103. In the present embodiment, an explanation is given by supposing a case when the first liquid bottle exists as the product of the subscription service provided by the service provider and the addition of the second liquid bottle as a new product is determined by the service provider.

<Flow of Processing of Whole Information Processing System>

Figure 12:
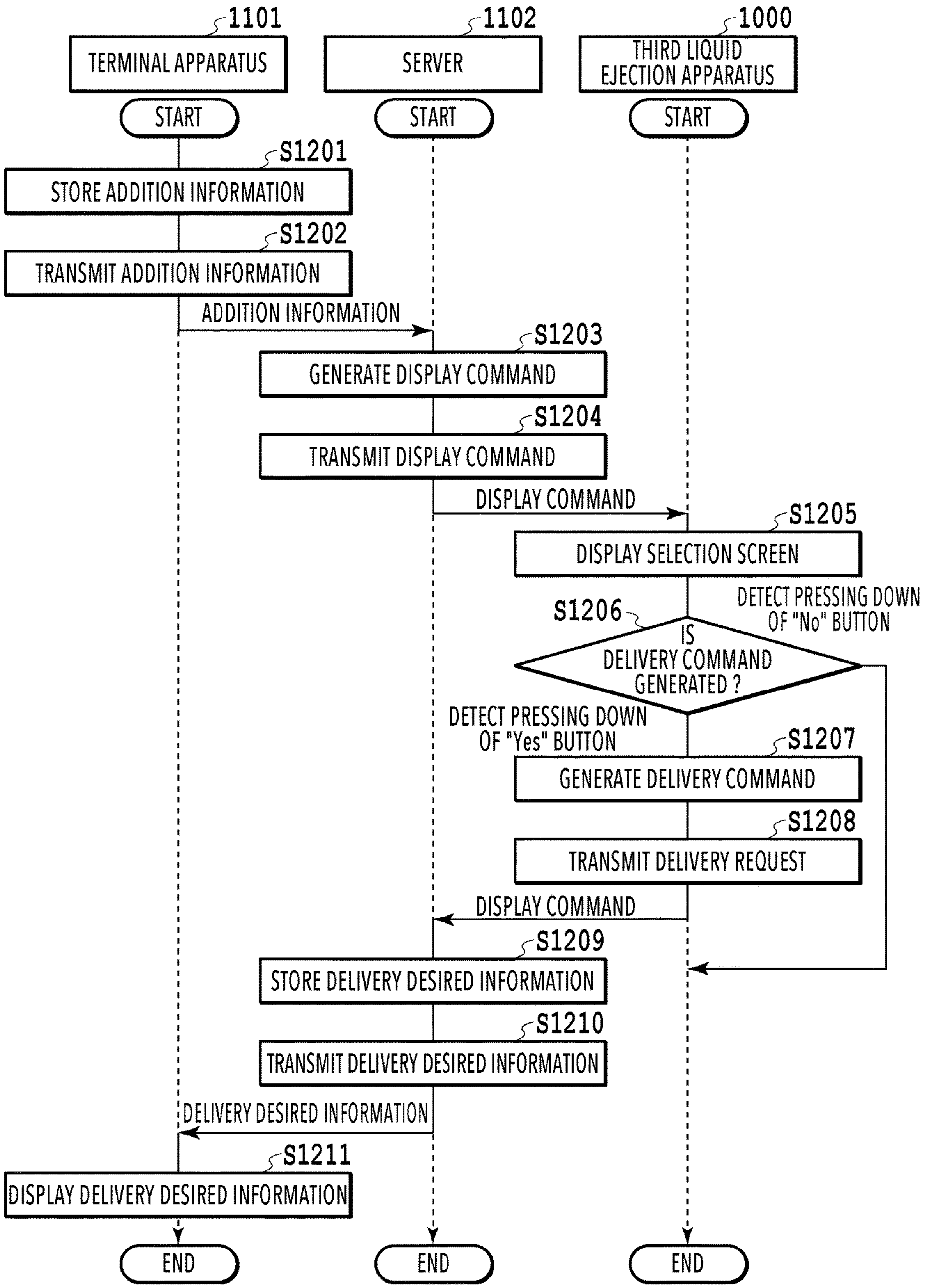
FIG. 12 is a sequence diagram showing a flow of processing between apparatuses in one embodiment.

FIG. 12 is a sequence diagram showing a flow of processing between apparatuses from the storage of addition information indicating that the second liquid bottle is added to the product of the subscription service until the transmission of a command to deliver the second transparent member 902.

Further, as the premise that the series of processing in FIG. 12 is performed, a user has subscribed to the subscription service delivering the first liquid bottle periodically and is in the state of utilizing the third liquid ejection apparatus 1000. In the server 1102, identification information for uniquely identifying the third liquid ejection apparatus 1000, user information for uniquely identifying the user utilizing the third liquid ejection apparatus 1000, and the delivery destination of the second transparent member 902 are stored in association with one another.

As one example of the identification information, there is a manufacturer's serial number, or the like, of the third liquid ejection apparatus 1000. As one example of the user information, there is a user ID of the user, or the like. As one example of the delivery destination of the second transparent member 902, there is an address of the user or the like.

The series of processing in FIG. 12 is performed by each CPU comprised by the terminal apparatus 1101, the server 1102, and the third liquid ejection apparatus 1000 rasterizing a program code stored in the ROM, or the like, onto the RAM and executing the program code. Further, part or all of the functions of the steps in FIG. 12 may be implemented by hardware, such as an ASIC or an electronic circuit. A symbol "S" in the explanation of each piece of processing means that the step is a step in the sequence diagram.

For example, triggered by the service provider inputting addition information indicating that the second liquid bottle is added to the product of the subscription service by using the terminal apparatus 1101, the series of processing in FIG. 12 is started.

At S1201, the terminal apparatus 1101 stores addition information including that a new size (capacity) liquid bottle is added in the market. In this example, as described above, the addition information is input by the service provider. After completing the processing at this step, the terminal apparatus 1101 performs the processing at S1202.

At S1202, the terminal apparatus 1101 transmits the addition information to the server 1102. Upon receipt of the addition information, the server 1102 performs the processing at S1203.

At S1203, on the condition that the addition information is received correctly, the server 1102 performs processing to generate a display command to cause the display unit comprised by the third liquid ejection apparatus 1000 to display a selection screen for the selection of whether or not it is necessary to deliver the second transparent member. After completing the processing at this step, the server 1102 performs the processing at S1204.

At S1204, the server 1102 transmits the display command to the third liquid ejection apparatus 1000. Upon receipt of the display command, the third liquid ejection apparatus 1000 performs the processing at S1205.

At S1205, on the condition that the display command is received correctly, the third liquid ejection apparatus 1000 performs processing to cause the display unit to display a selection screen. After completing the processing at this step, the third liquid ejection apparatus 1000 performs the processing at S1206.

Figure 13:
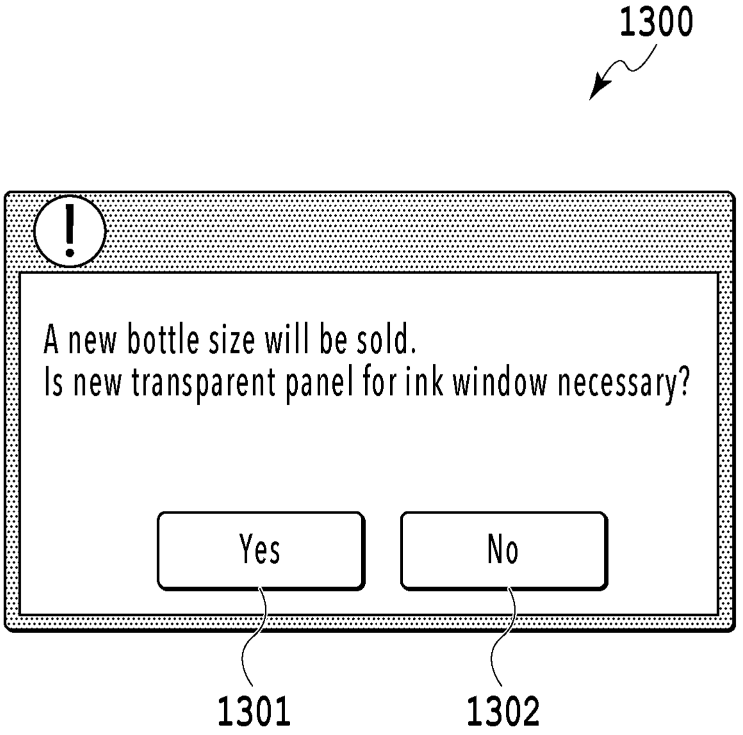
FIG. 13 is a diagram showing one example of a selection screen in one embodiment.

FIG. 13 is a diagram showing one example of a selection screen 1300 to be displayed on the display unit of the third liquid ejection apparatus 1000.

As shown in FIG. 13, the selection screen 1300 in the present embodiment includes a notification sentence for notifying the public that a new size liquid bottle is provided in the market and a question sentence for asking a user whether or not the delivery of the second transparent member is necessary. Further, the selection screen 1300 includes a "Yes" button 1301 to agree with the delivery of the second transparent member from the service provider and a "No" button 1302 to disagree with the delivery of the second transparent member from the service provider.

It is possible for a user to input information indicating that the delivery of the second transparent member by the service provider is necessary by pressing down the "Yes" button 1301. On the other hand, it is possible for a user to input information indicating that the delivery of the second transparent member by the service provider is not necessary by pressing down the "No" button 1302.

In the following, with reference to FIG. 12 again, the rest of the series of processing in the present embodiment is explained.

At S1206, the third liquid ejection apparatus 1000 determines whether or not to generate a delivery command to cause the service provider to arrange for the delivery of the second transparent member. That is, the third liquid ejection apparatus 1000 detects which of the "Yes" button 1301 and the "No" button 1302 is pressed down by a user on the selection screen 1300. In a case of detecting the pressing down of the "No" button 1302, the third liquid ejection apparatus 1000 terminates the present processing. On the other hand, in a case of detecting the pressing down of the "Yes" button 1301, the third liquid ejection apparatus 1000 performs the processing at S1207.

At S1207, the third liquid ejection apparatus 1000 generates the above-described delivery command. After completing the processing at this step, the third liquid ejection apparatus 1000 performs the processing at S1208.

At S1208, the third liquid ejection apparatus 1000 transmits a delivery request including the delivery command to the server 1102. Upon receipt of the delivery request, the server 1102 performs the processing at S1209.

At S1209, the server 1102 stores delivery desired information including that a user desires the delivery of the second transparent member on the condition that the delivery request is received correctly. The delivery desired information is stored in association with identification information, user information and the delivery destination of the second transparent member. After completing the processing at this step, the server 1102 performs the processing at S1210.

At S1210, the server 1102 transmits the delivery desired information to the terminal apparatus 1101. Upon receipt of the delivery desired information, the terminal apparatus 1101 performs the processing at S1211.

At S1211, the terminal apparatus 1101 displays the delivery desired information on the display unit (for example, liquid crystal display not shown schematically).

By the above, the series of processing shown in FIG. 12 is completed.

Due to this, it is possible for the service provider to recognize that a user desires the delivery of the second transparent member. Then, it is made possible for the service provider to arrange for the deliver of the second transparent member to the user.

According to the configuration such as this, even in a case when a new size (capacity) liquid bottle is provided in the market, it is made possible to deliver the transparent member to a user, which comprises an indicator indicating whether or not all the liquid stored in the liquid bottle can be injected. Then, by mounting the delivered transparent member to the liquid ejection apparatus, it is possible for a user to visually recognize whether or not all the liquid stored in the new size liquid bottle can be injected.

Other Embodiments

In the embodiments described above, an explanation is given by taking the ink jet printer, which is a multifunction peripheral, as one example of the liquid ejection apparatus. However, the liquid ejection apparatus to which the above-described embodiments can be applied is not limited to the ink jet printer. As the liquid ejection apparatus, it may also be possible to use a monochrome printer, a copy machine, a facsimile, or the like, or use a printer not equipped with the scanner function.

In the example shown in FIG. 3A, the liquid tank 110 is incorporated in the main body of the liquid ejection apparatus 100, but the configuration is not limited to this. As long as it is possible to supply liquid from the liquid tank 110 to the liquid ejection head 401 (see FIG. 4), the liquid tank 110 may be arranged outside the main body of the liquid ejection apparatus 100.

In the example shown in FIG. 3A, the capacity of the liquid tank 110 is the same for all the liquid tanks. However, it may also be possible to increase the capacity of the liquid tank capable of storing a predetermined type of liquid. For example, it may also be possible to increase the capacity of the liquid tank 110Bk capable of storing the black ink whose frequency of use is high compared to that of the liquid tank 110C, the liquid tank 110M, and the liquid tank 110Y. In this case, it is supposed that the capacity of the liquid bottle storing the black ink is greater than that of the liquid bottle storing the ink of the other colors. Consequently, in the case such as this, in accordance with the capacity of the liquid bottle storing the black ink, the position of the indicator to be formed on the transparent member changes. For example, it may also be possible to form the indicator indicating whether or not all the ink stored in the liquid bottle storing the black ink can be injected in the state where the tank cover is closed at the position below the positions of the other indicators in the vertical direction.

In the example shown in FIG. 10, the transparent panel is attached and detached as the transparent member. As another example of the transparent member, there is a transparent seal. In the state where the height of the liquid surface of the liquid stored in the liquid tank is the same as that of the position of the indicator of the transparent seal, in a case when the liquid tank becomes full by ejecting all the liquid stored in the unused liquid bottle into the liquid tank, it may also be possible to apply the transparent seal. In this case, the transparent seal is pasted to the tank cover detachably so as to cover the window frame. With the configuration such as this, it is also possible for a user to visually recognize whether or not all the liquid stored in the liquid bottle can be injected.

In the fourth embodiment, the selection screen 1300 (see FIG. 13) is displayed on the display unit 106 (see FIG. 1) of the liquid ejection apparatus 100, but the selection screen 1300 may be displayed on the display unit of the terminal apparatus (for example, PC, smartphone, or the like) of a user. In this case, it is possible for a user to select whether or not the transparent member is necessary by using the terminal apparatus.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the technique of the present invention, it is possible to cause a user to recognize that all the liquid stored in an unused liquid bottle can be injected into a liquid tank.

What is claimed is:

1. A liquid ejection apparatus comprising:

a liquid ejection head capable of ejecting liquid onto a printing medium;

a liquid tank capable of storing liquid to be supplied to the liquid ejection head and whose front wall is transparent;

a transparent portion arranged at a position facing the front wall and through which one may visually recognize the remaining amount of liquid inside the liquid tank, wherein, on the transparent portion, in order to indicate whether one may inject all the liquid stored in a predetermined liquid bottle in an unused state into the liquid tank, an indicator is formed, which can be compared with a liquid surface of liquid stored in the liquid tank;

a reception unit capable of receiving, from an external device, a display command of a graphical user interface for asking whether or not delivery of a transparent member with which the transparent portion can be exchanged is necessary;

a display unit configured to display the graphical user interface in a case when the reception unit receives the display command;

an obtaining unit capable of obtaining instructions input based on contents displayed on the display unit; and a transmission unit configured to transmit a delivery command for requesting delivery of the transparent member to an external device in a case when the obtaining unit obtains information indicating that delivery of the transparent member is necessary.

2. The liquid ejection apparatus according to claim 1, wherein the liquid tank includes a plurality of liquid tanks capable of storing each of a plurality of types of liquid and the indicator is formed at a position corresponding to each of the plurality of liquid tanks.

3. The liquid ejection apparatus according to claim 2, wherein at least one of the plurality of liquid tanks has a capacity different from that of the other liquid tanks.

4. The liquid ejection apparatus according to claim 1, wherein, as the indicator:

a first indicator is formed for indicating whether all the liquid stored in a first liquid bottle in an unused state may be injected into the liquid tank; and a second indicator is formed for indicating whether all the liquid stored in a second liquid bottle in an unused state, whose capacity is different from that of the first liquid bottle, may be injected into the liquid tank.

5. The liquid ejection apparatus according to claim 1, wherein the transparent portion is arranged so as to be detachably attached to a cover member for covering the liquid tank.

6. The liquid ejection apparatus according to claim 5, wherein the cover member comprises grooves into which the end portion of the transparent portion can be inserted.

* * * * *